(12) United States Patent
Gabauer et al.

(10) Patent No.: US 6,640,789 B2
(45) Date of Patent: Nov. 4, 2003

(54) APPARATUS FOR PUMPING FUEL FROM A TANK TO AN INTERNAL COMBUSTION ENGINE OF A MOTOR VEHICLE

(75) Inventors: Wolfgang Gabauer, Asperg (DE); Dieter Schreckenberger, Marbach (DE); Tony Wheeler, Anderson, SC (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/049,185

(22) PCT Filed: May 26, 2001

(86) PCT No.: PCT/DE01/02031
§ 371 (c)(1),
(2), (4) Date: May 31, 2002

(87) PCT Pub. No.: WO01/94143
PCT Pub. Date: Dec. 13, 2001

(65) Prior Publication Data
US 2002/0152996 A1 Oct. 24, 2002

(30) Foreign Application Priority Data
Jun. 8, 2000 (DE) .......................................... 100 28 458

(51) Int. Cl.[7] .............................................. F02M 37/04
(52) U.S. Cl. ...................................... 123/509; 137/578
(58) Field of Search .......................... 123/509; 137/571, 137/576, 578; 417/428

(56) References Cited

U.S. PATENT DOCUMENTS

| 5,110,265 | A | * | 5/1992 | Kato et al. .................. 417/428 |
| 5,218,942 | A | * | 6/1993 | Coha et al. .................. 123/509 |
| 5,680,847 | A | * | 10/1997 | Begley et al. .............. 123/509 |
| 6,502,558 | B1 | * | 1/2003 | Brunel ........................ 123/509 |

* cited by examiner

Primary Examiner—Thomas N. Moulis
(74) Attorney, Agent, or Firm—Ronald E. Greigg

(57) ABSTRACT

Fuel pumping apparatus having an impoundment container, disposed in a tank, in which impoundment container a pumping assembly is disposed that pumps fuel to the internal combustion engine. A jet pump is supplied with some of the fuel pumped by the pumping assembly and pumps fuel out of the tank into the impoundment container. Below the pumping assembly, near a bottom of the impoundment container, there is a suction chamber, from which the pumping assembly aspirates fuel. A connection of the suction chamber to the impoundment container is controlled by a float valve, disposed laterally next to the pumping assembly, and by means of this valve, when the impoundment container is full, the suction chamber communicates with the impoundment container; in this state, the pumping assembly aspirates fuel from the impoundment container. A connection of the suction chamber to the tank is controlled by a check valve, which is disposed on the bottom of the impoundment container and by which the suction chamber communicates with the tank when the impoundment container is empty; in this state, the pumping assembly aspirates fuel from the tank.

20 Claims, 2 Drawing Sheets

APPARATUS FOR PUMPING FUEL FROM A TANK TO AN INTERNAL COMBUSTION ENGINE OF A MOTOR VEHICLE

CROSS-REFERENCE TO RELATED APPLICATIONS

This is a 35 U.S.C. 37 application of PCT/DE 01/02031, filed on May 26, 2001.

BACKGROUND OF THE INVENTION

1. Field of the Invention

The invention is directed to an improved apparatus for pumping fuel from a tank to an internal combustion engine of a motor vehicle in which a pumping assembly is disposed in an impoundment container in the vehicle fuel tank.

2. Description of the Prior Art

One fuel pumping apparatus of the type with which this invention is concerned is known from German Patent Disclosure DE 3942 312 A1. That apparatus has an impoundment container, disposed in the tank, in which a pumping assembly that pumps fuel to the engine is disposed. The apparatus has a jet pump, which is supplied with some of the fuel pumped by the pumping assembly and pumps the fuel out of the tank into the impoundment container. In the process, the portion of the fuel pumped by the pumping assembly that is not consumed by the engine and is returned to the tank is delivered to the jet pump. Near a bottom of the impoundment container, there is a suction chamber, from which the pumping assembly aspirates fuel. When the impoundment container is full, the suction chamber communicates with it via a valve assembly and is disconnected from the tank, so that the pumping assembly aspirates fuel from the impoundment container. When the impoundment container is empty, the suction chamber communicates with the tank through the valve assembly and is disconnected from the impoundment container, so that the pumping assembly aspirates fuel from the tank. An empty impoundment container exists if the tank has been emptied enough that the jet pump cannot pump any further fuel from it into the impoundment container. If a slight quantity of fuel, for instance from a reserve canister, is then used to replenish the tank, then although the impoundment container is still not full, nevertheless the pumping assembly, controlled by the valve assembly, is capable of aspirating fuel directly from the tank. In this case, however, it should be assured that the pumping assembly can reliably aspirate the fuel from the tank at even the least possible fill level of the fuel. In the known apparatus, the valve assembly is disposed under the pumping assembly, resulting in a large structural height, and the pumping assembly must aspirate the fuel from the tank over a great height, which demands a corresponding pumping height.

SUMMARY OF THE INVENTION

The apparatus of the invention has the advantage over the prior art that only the check valve is disposed on the bottom of the impoundment container, and thus the pumping assembly can be disposed near the bottom of the impoundment container and hence near the bottom of the tank, and therefore at even a very slight fill level of the fuel in the tank, fuel can be aspirated from the tank by the pumping assembly over a low pumping height. By disposing the float valve laterally offset from the pumping assembly, a low structural height of the apparatus is attained.

BRIEF DESCRIPTION OF THE DRAWINGS

Other features and advantages of the invention will become apparent from the description contained below, taken in conjunction with the drawings, in which.

DESCRIPTION OF THE PREFERRED EMBODIMENTS

Figure 1:
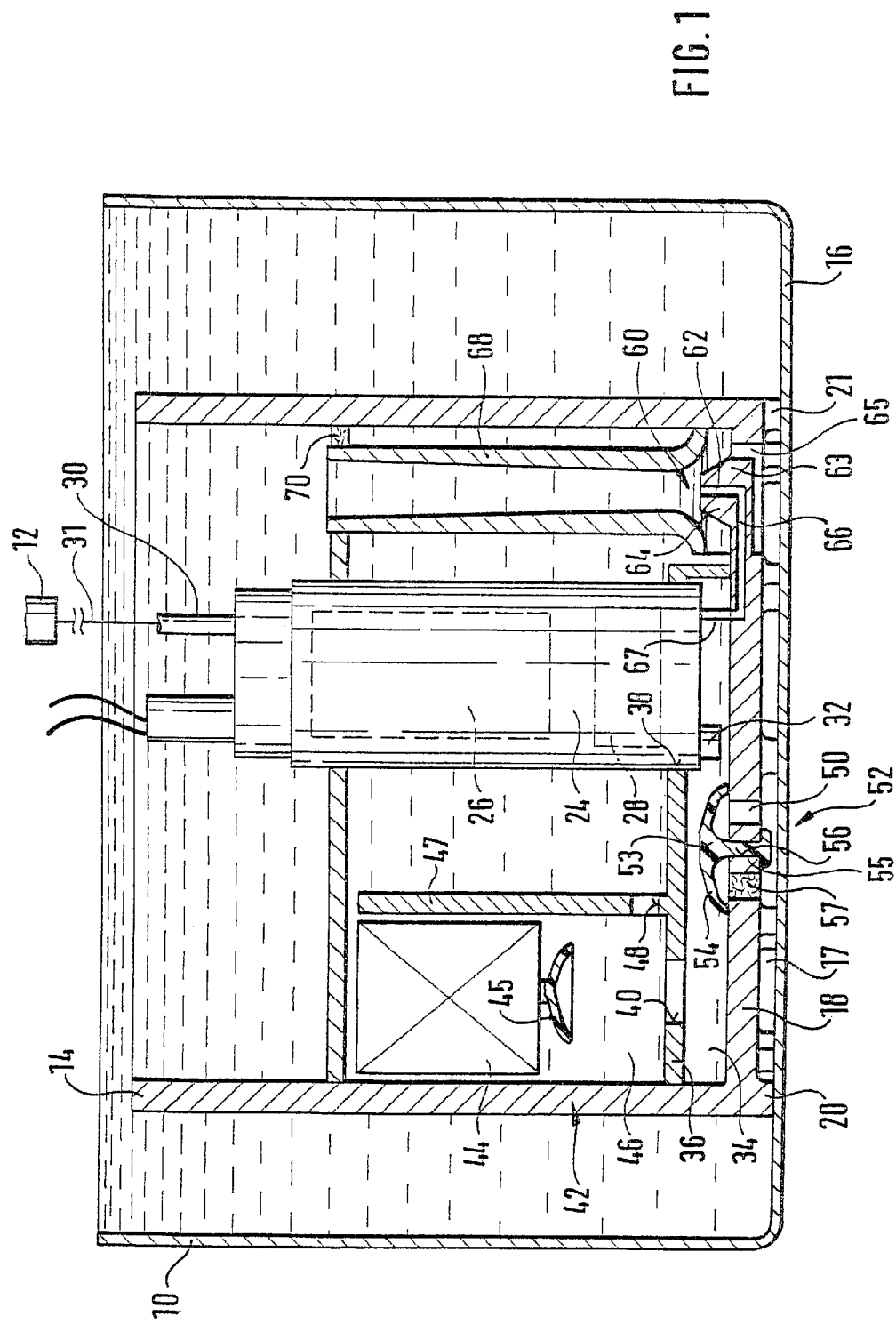
FIG. 1 shows an apparatus for pumping fuel from a tank to an internal combustion engine of a motor vehicle with a full impoundment container.
Figure 2:
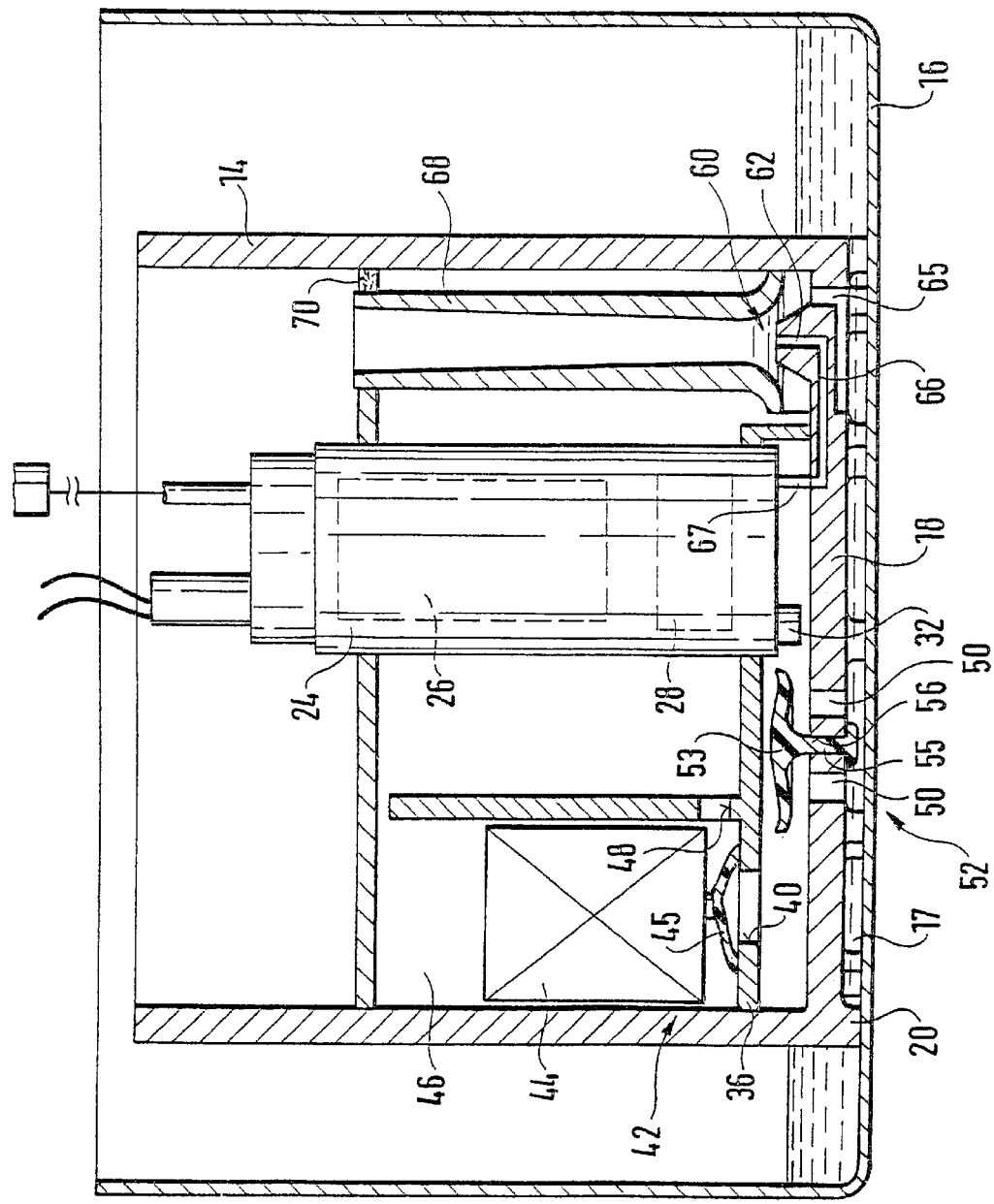
FIG. 2 shows the apparatus with an empty impoundment container.

In FIGS. 1 and 2, an apparatus for pumping fuel out of a tank 10 to an internal combustion engine 12 of a motor vehicle is shown. The engine 12 has an injection system, through which fuel is injected into the engine cylinders. The apparatus has a cup-shaped impoundment container 14, which is disposed in the tank 10 and is open at the top and which has a substantially lesser volume than the tank 10. In a manner not shown in detail, the impoundment container 14 is retained in the tank 10 and sits on the bottom 16 of the tank 10. The bottom 18 of the impoundment container 14 is spaced slightly apart from the bottom 16 of the tank 10, so that a space 17 remains between the bottom 18 of the impoundment container 14 and the bottom 16 of the tank 10. Between the bottom 16 of the tank 10 and the bottom 18 of the impoundment container 14, a ring 20 extending over the circumference of the impoundment container 14 can be provided, which assures the requisite spacing between the tank bottom 16 and the bottom 18 of the impoundment container 14 and which has many openings 21, through which the space 17 between the tank bottom 16 and the bottom 18 of the impoundment container 14 communicates with the rest of the tank 10.

A pumping assembly 24, by which fuel is pumped to the engine 12, is disposed in the impoundment container 14. The pumping assembly 24 has an electric drive motor 26 and a pumping part 28, which are disposed in a common housing. The pumping assembly 24 is disposed in the impoundment container 14 in such a way that its pumping part 28 points toward the bottom 18 of the impoundment container 14. In its upper end region, the pumping assembly 24 has an outlet neck 30, to which a line 31 is connected, through which line the fuel pumped by the pumping assembly 24 reaches the engine 12. The pumping assembly 24 also has electrical terminals in its upper end region for the drive motor 26, to which terminals lines from a voltage source are connected. In its lower end region, the pumping assembly 24 has an intake neck 32, through which, in operation of the pumping assembly 24, the pumping part 28 aspirates fuel.

With its lower end region that has the intake neck 32, the pumping assembly 24 protrudes into a suction chamber 34 that is partitioned off in the impoundment container 14. The suction chamber 34 is separated from the rest of the impoundment container 14 by an insert part 36, which is inserted into the impoundment container 14, is spaced apart from the bottom 18 of the impoundment container 14, and has an opening 38, through which the lower end region of the pumping assembly 24 protrudes from the impoundment container 14 into the suction chamber 34. Laterally offset from the opening 38, the insert part 36 has a further opening 40, which forms a connection of the suction chamber 34 to the remainder of the impoundment container 14. The opening 40 is controlled by a float valve 42, which has a float body 44, disposed above the insert part 36, that in its lower end region has a valve member 45, by which the opening 40 of the insert part 36 can be closed. The valve member 45 is embodied as cap-shaped, for instance, so that it covers the opening 40 to close it and rests on the edge next to the opening 40 of the insert part 36. The valve member 45 is preferably embodied as being elastically deformable and for instance comprises fuel-resistant rubber or plastic. The float body 44 is guided in a chamber 46 so that it is movable vertically; the chamber 46 is defined at the bottom by the insert part 36, in the impoundment container 14 by a side wall 47, and also by a side wall of the impoundment container 14. The chamber 46 can be open at the top. In the side wall 47, at least one opening 48 is embodied near the lower end of the side wall that points toward the insert part 36; through this opening, the chamber 46 communicates with the impoundment container 14 above the insert part 36. The float body 44 with the valve member 45 has a lower specific gravity than the fuel and therefore floats in the fuel. The float valve 42 is laterally offset from the pumping assembly 24.

In the bottom 18 of the impoundment container 14, there is at least one opening 50, through which the suction chamber 34 communicates with the space 17 defined between the tank bottom 16 and the bottom 18 of the impoundment container 14. The opening 50 is controlled by a check valve 52, which opens into the suction chamber 34. The check valve 52 has a valve member 53, with a caplike region 54 which is disposed in the suction chamber 34 and from which a peg 55 protrudes that passes through a bore 56 and has a thickened portion on its other end, so that the valve member 53 is fixed. The caplike region 54 is embodied in elastically deformable fashion and to close the opening 50 comes to rest on the edge, next to the opening, of the bottom 18 of the impoundment container 14. Like the valve member 45 of the float valve 42, the valve member 53 preferably comprises fuel-resistant plastic or rubber. The bore 56 can be embodied in the bottom 18 of the impoundment container 14, in which case the opening 50 is formed by a plurality of apertures in order to obtain a middle region that has the bore 56 on the bottom 18. Alternatively, the check valve 52 can form a structural unit, comprising the valve member 53 and a carrier element that has the bore 56 and the opening 50, and this structural unit is then inserted into an opening in the bottom 18. A filter 57 can be disposed in the opening 50.

Next to the pumping assembly 24, approximately opposite the float valve 42, there is a jet pump 60, by which fuel from the tank 10 is pumped into the impoundment container 14. The jet pump 60 has a jet nozzle 62, which is formed by an extension 63 protruding upward from the bottom 18 of the impoundment container 14 and an extension 64 of the insert part 36 and is oriented approximately vertically. Surrounding the jet nozzle 62 in the bottom 18 of the impoundment container 14, there is at least one opening 65 to the space 17, through which opening the jet pump 60 can aspirate fuel from the space 17. The jet pump 60 communicates with the pumping assembly 24 and is supplied with a portion of the fuel pumped by the pumping assembly 24. The pumping part 28 of the pumping assembly 24 is preferably embodied as a flow pump, and in particular as a side-channel pump. The pumping part 28 has an impeller, which is driven to revolve and cooperates with at least one pumping channel, and by which fuel in the pumping channel is pumped from an inlet opening, communicating with the intake neck 32, to an outlet opening communicating with the outlet neck 30. The connection of the pumping part 28 to the jet pump 60 preferably branches off directly from the pumping channel of the pumping part 28 in a region between the inlet opening and the outlet opening, in which the full pumping pressure is not yet available. The connection of the jet pump 60 to the pumping part 28 of the pumping assembly 24 extends along the bottom 18 of the impoundment container 14, with a channel 66 defined between the bottom 18 and the insert part 36. Leading away from the channel 66 is a neck 67, which is inserted into a cap part in the lower end region of the pumping assembly 24 and which communicates with the pumping channel of the pumping part 28. The jet nozzle 62 of the jet pump 60 is adjoined by an approximately vertically extending riser pipe 68, through which fuel pumped by the jet pump 60 reaches the impoundment container 14. Approximately at the level of the mouth of the riser pipe 68, or below that, a filter 70 is inserted into the impoundment container 14; the fuel pumped by the jet pump 60 reaches the impoundment container through this filter.

The function of the apparatus will now be described. In FIG. 1, the apparatus is shown in a state in which the impoundment container 14 is full of fuel. In that case, the float body 44 of the float valve 42 is disposed in accordance with the level of fuel in the impoundment container 14, so that the valve member 45 of the float valve is spaced apart from the insert part 36, and the opening 40 is uncovered, so that the suction chamber 34 communicates with the impoundment container 14 via the opening 40, the chamber 46, and the opening 48. The static pressure of the fuel column in the impoundment container 14 is operative on the caplike region 54 of the valve member 53 of the check valve 52, so that this region is pressed against the bottom 18 of the impoundment container 14, and the check valve 52 is kept closed. During operation of the pumping assembly 24, the pumping assembly aspirates fuel from the suction chamber 34 and thus from the impoundment container 14 via the intake neck 32 and pumps it to the engine 12 via the outlet neck 30 and the line 31. Some of the fuel aspirated by the pumping assembly 24 is delivered to the jet pump 60 via the neck 67 and the channel 66. In the jet pump 60, the fuel delivered to it from the pumping assembly 24 emerges from the jet nozzle 62 and, via the opening 65, fuel additionally travels out of the space 17 and thus out of the tank 10 along with it; the entire fuel quantity pumped by the jet pump 60 reaches the impoundment container 14 through the riser pipe 68. The fuel pumped into the impoundment container 14 flows through the filter 70 before it reaches the suction chamber 34, so that the pumping assembly 24 in the suction chamber 34 aspirates only cleaned fuel.

In FIG. 2, the apparatus is shown in a state in which the impoundment container 14 is empty, and there is only a slight fuel quantity with a correspondingly low fill level in the tank 10. This is the state the apparatus is in when the tank 10 has been mostly emptied and the impoundment container 14 has also been emptied by suction by the pumping assembly 24, after which only a small quantity of fuel, for instance from a reserve canister, has been placed in the tank 10. The float body 44 of the float valve 42 lacks buoyancy because the impoundment container 14 is empty, so the valve member 45 rests on the insert part 36 and closes the opening 40. When the pumping assembly 24 is operated, it generates an underpressure in the suction chamber 34, as a result of which the caplike region 54 of the valve member 53 of the check valve 52 is lifted from the bottom 18 of the impoundment container 14, so that the opening 50 is uncovered, and fuel is aspirated from the space 17 and thus the tank 10 by the pumping assembly 24. Thus by the pumping assembly 24, fuel is aspirated from the tank 10 and pumped to the engine 12. In parallel, fuel is also delivered to the jet pump 60, so that by this pump, fuel is pumped into the impoundment container 14. The check valve 52 remains open until such time as the fill level in the impoundment container 14 is high enough to open the float valve 42 by lifting its float body 44, so that the valve member 45 uncovers the opening 40. After that, the check valve 52 is closed by the pressure of the fuel column in the impoundment container 14, and the pumping assembly 24 aspirates fuel from the impoundment container 14, which continues to be filled by the jet pump 60.

The bottom 18 of the impoundment container 14 that has the check valve 52 is placed as close as possible to the bottom 16 of the tank 10, so that aspiration of fuel by the check valve 52 into the suction chamber 34 is still possible even at a slight fill level in the tank 10. The disposition of the bottom 18 of the impoundment container 14 and of the check valve 52 is preferably such that a fill level of only about 8 mm in the tank already suffices to enable aspirating fuel into the suction chamber 34.

The foregoing relates to preferred exemplary embodiments of the invention, it being understood that other variants and embodiments thereof are possible within the spirit and scope of the invention, the latter being defined by the appended claims.

We claim:

1. An apparatus for pumping fuel from a tank to an internal combustion engine of a motor vehicle, comprising an impoundment container (14) disposed in the tank (10), a pumping assembly (24) disposed in the impoundment chamber for pumping fuel to the engine (12), having a jet pump (60) to which a portion of the fuel pumped by the pumping assembly (24) is delivered and which pumps fuel out of the tank (10) into the impoundment container (14), a suction chamber disposed under the pumping assembly (24) near a bottom (18) of the impoundment container (14) and from which suction chamber the pumping assembly (24) aspirates fuel, and a valve assembly (42, 60), by way of which, when the impoundment container (14) is full, the suction chamber (34) communicates with it and is disconnected from the tank (10), so that the pumping assembly (24) aspirates fuel from the impoundment container (14), and by way of which when the impoundment container (14) is empty, the suction chamber (34) communicates with the tank (10) and is disconnected from the impoundment container (14), so that the pumping assembly (24) aspirates fuel from the tank (10), the valve assembly having a float valve (42), which controls the connection of the suction chamber (34) to the impoundment container (14) and is disposed laterally next to the pumping assembly (24), and a check valve (52), which controls the connection of the suction chamber (34) to the tank (10) and is disposed on the bottom (18) of the impoundment container (14).

2. The apparatus of claim 1, herein the check valve (52) is disposed laterally offset from the pumping assembly (24).

3. The apparatus of claim 1, wherein the check valve (52) has a valve member (53), with a caplike region (54) disposed in the suction chamber (34), by which region an opening (50) in the bottom of the impoundment container (14), which opening leads into the tank (10), can be closed.

4. The apparatus of claim 2, wherein the check valve (52) has a valve member (53), with a caplike region (54) disposed in the suction chamber (34), by which region an opening (50 in the bottom of the impoundment container (14), which opening leads into the tank (10), can be closed.

5. The apparatus of claim 3, wherein the caplike region (54) of the valve member (53) is elastically deformable.

6. The apparatus of claim 4, wherein the caplike region (54) of the valve member (53) is elastically deformable.

7. The apparatus of claim 1, wherein the float valve (42) has a float body (44), which is guided displaceably in a chamber (46) that communicates with the impoundment container (14) and which carries a valve member (45), by which an opening (40) from the suction chamber (34) into the impoundment container (14) can be closed.

8. The apparatus of claim 2, wherein the float valve (42) has a float body (44), which is guided displaceably in a chamber (46) that communicates with the impoundment container (14) and which carries a valve member (45), by which an opening (40) from the suction chamber (34) into the impoundment container (14) can be closed.

9. The apparatus of claim 3, wherein the float valve (42) has a float body (44), which is guided displaceably in a chamber (46) that communicates with the impoundment container (14) and which carries a valve member (45), by which an opening (40) from the suction chamber (34) into the impoundment container (14) can be closed.

10. The apparatus of claim 4, wherein the float valve (42) has a float body (44), which is guided displaceably in a chamber (46) that communicates with the impoundment container (14) and which carries a valve member (45), by which an opening (40) from the suction chamber (34) into the impoundment container (14) can be closed.

11. The apparatus of claim 7, wherein the jet pump (60) has a connection (66), extending at least approximately along the bottom (18) of the impoundment container (14), to the pumping assembly (24).

12. The apparatus of claim 8, wherein the jet pump (60) has a connection (66), extending at least approximately along the bottom (18) of the impoundment container (14), to the pumping assembly (24).

13. The apparatus of claim 9, wherein the jet pump (60) has a connection (66), extending at least approximately along the bottom (18) of the impoundment container (14), to the pumping assembly (24).

14. The apparatus of claim 10, wherein the jet pump (60) has a connection (66), extending at least approximately along the bottom (18) of the impoundment container (14), to the pumping assembly (24).

15. The apparatus of claim 1, further comprising a filter (70) disposed in the impoundment container (14), through which filter fuel pumped by the jet pump (60) reaches the suction chamber (34).

16. The apparatus of claim 3, further comprising a filter (70) disposed in the impoundment container (14), through which filter fuel pumped by the jet pump (60) reaches the suction chamber (34).

17. The apparatus of claim 7, further comprising a filter (70) disposed in the impoundment container (14), through which filter fuel pumped by the jet pump (60) reaches the suction chamber (34).

18. The apparatus of claim 1, further comprising a filter (57) is disposed in the connection of the suction chamber (34) to the tank (10).

19. The apparatus of claim 7, further comprising a filter (57) is disposed in the connection of the suction chamber (34) to the tank (10).

20. The apparatus of claim 17, further comprising a filter (57) is disposed in the connection of the suction chamber (34) to the tank (10).

* * * * *